Oct. 16, 1956 A. REICH 2,766,945
WIRE WINDING APPARATUS WITH CONSTANT TENSION
Filed May 9, 1955

INVENTOR
Adolf Reich,

BY Pierce, Scheffler & Parker,
ATTORNEYS.

United States Patent Office 2,766,945
Patented Oct. 16, 1956

2,766,945

WIRE WINDING APPARATUS WITH CONSTANT TENSION

Adolf Reich, Backnang, Wurttemberg, Germany, assignor to Firma Willy Aumann, Werkstätten für Feinmechanik und Apparatebau, Lohne, Westphalia, Germany Application May 9, 1955, Serial No. 507,001
In Germany October 1, 1948

Public Law 619, August 23, 1954
Patent expires October 1, 1968

3 Claims. (Cl. 242—45)

This invention relates to wire winding apparatus and more particularly to apparatus for maintaining a substantially constant tension on a wire as it is wound upon a spool or coil form from a supply reel.

It is known to tension a wire as it is drawn from a supply reel by applying a brake to the reel and decreasing the braking action as the wire is withdrawn from the reel. A feeler device in contact with the wire on the reel has been employed as a scanning element to adjust the brake, but such arrangements are effective only so long as the wire is drawn from the reel at a constant speed, and the wire may break if the wire speed varies substantially, for example during acceleration at the start of the winding.

Objects of the present invention are to provide wire winding apparatus which includes a brake on the wire supply reel, and improved mechanism for adjusting the brake to avoid the disadvantages of the prior tensioning systems. An object is to provide wire winding apparatus of the type which includes a brake on the delivery or supply reel and mechanism for adjusting the brake jointly in accordance with the wire tension and with the weight of the wire remaining on the supply reel.

These and other objects and the advantages of the invention will be apparent from the following specification when taken with the accompanying drawing in which.

Figures 1, 2, 3:
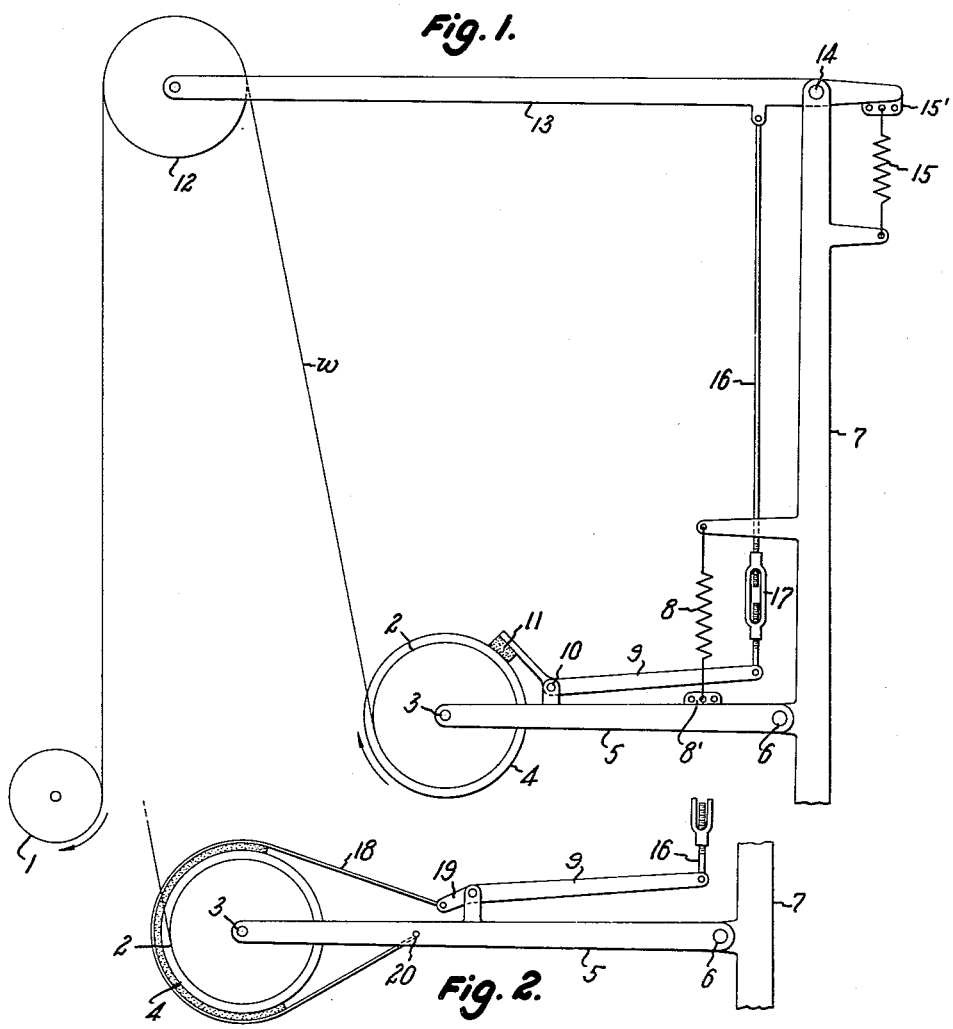
Fig. 1 is a schematic elevation of wire winding apparatus embodying the invention.
Fig. 2 is a fragmentary schematic view of a modification of the same.
Fig. 3 is a side elevation, with part in section, of another form of brake lever.

In Fig. 1, the reference numeral 1 identifies a spool or coil form which is rotated in the direction of the arrow by any appropriate means, not shown, to wind thereon a wire w drawn from a supply reel 2 which is fitted upon the shaft 3 of a brake drum 4. Through friction or a spline, not shown, the reel 2 drives the brake drum as the wire is withdrawn from the reel.

The shaft 3 is journalled in the outer end of a lever 5 having its inner end mounted on a pivot bearing 6 secured to the machine frame 7, and a weight, or preferably a spring 8, balances the lever 5 and its supported elements to maintain the lever yieldingly in an intermediate and approximately horizontal position. Since the dead weight of the supply reels as well as the amount of stored wire may vary with the type of reel, it is necessary to adjust the force of the spring to obtain the desired balance and this may be done by providing on the lever 5 a flange 8' having a series of openings into which the lower end of spring 8 is selectively engaged to adjust the length of its lever arm. A brake lever 9 is mounted on a bearing 10 carried by the lever 5 and has a brake shoe 11 for cooperation with the brake drum 4.

The wire w is drawn over an idler pulley 12 carried by a lever 13 which is mounted above lever 5 on a bearing 14 supported on the machine frame and yieldingly held in an intermediate and approximately horizontal position by a spring 15 which, preferably, is adjustably connected to a perforated flange 15' on lever 13. A motion-transmitting member 16 which includes a finely threaded turnbuckle 17 for adjustment of its length is connected between the lever 13 and the end of the brake lever 9.

The winding apparatus operates in the following manner. Levers 5 and 13 are normally balanced by their springs 8 and 15 so that they are in preselected intermediate positions of their respective limited ranges of angular adjustment, i. e. are approximately horizontal with the brake shoe 11 bearing upon the brake drum 4. On an increase in the tension in wire w, which increase may arise from an increased speed of rotation of the spool 1 or from the increase in the diameter of the wire winding on the spool 1 at a constant speed of rotation, the spring 15 yields under the increased tension and the resultant angular deflection of lever 13 displaces the motion-transmitting rod 16 to actuate brake lever 9 to reduce the pressure of brake shoe 11 on the brake drum 4. The tension in the wire w is thus automatically reduced to the desired normal value. Similarly, a reduction in the weight carried by the lever 5 as wire is drawn from reel 2 results in relative movement of lever 5 which reduces the braking effect. On the other hand, a decreased tension in wire w effects relative movement of levers 5 and 13 to actuate brake lever 9 to force brake shoe 11 more firmly against the brake drum.

Furthermore, when starting the winding on spool 1, the lever 13 swings relatively far downwardly for a short time to absorb the sharp increase in tension required for the initial acceleration of the storage reel 2, thus avoiding the breakage of wire which has been a defect of some of the prior wire winding machines. When lever 13 rocks downwardly at the initial rotation of spool 1, the brake lever 9 is depressed to lift the brake shoe 11, and it does not return into normal position in engagement with the brake drum 4 until the tension in wire w is again normal and the lever 13 has been returned to its preselected intermediate position by the spring 15.

In the modification shown in Fig. 2, the brake shoe has the form of a flexible band 18 partially encircling the brake drum 4 with its ends secured to the end 19 of brake lever 9 and to an anchor point 20 on lever 5, respectively.

As shown in Fig. 3, brake lever 9' is journalled on lever 5 by a bearing bolt 21 to which a pin 19' is secured to support the movable end of a brake band such as shown in Fig. 2. The bolt 21 is angularly adjustable in the brake lever 9' and provided with a gear section 22 in mesh with a worm 23 on a stud 24 journalled in the brake lever 9' and retained thereon by a spring 25 and screw 26. By rotation of the screw 24, the pin 19' is moved angularly about the axis of bolt 21, and thereby the movable end of the brake band is adjusted with respect to the brake drum 4.

I claim:

1. Apparatus for winding wire upon a spool or the like; said apparatus comprising a first lever carrying a shaft upon which a brake drum is mounted, a supply reel on which the wire is stored supported on said shaft to rotate said brake drum as the wire is unwound from the reel, a brake lever pivotally mounted on said first lever and having a brake shoe cooperating with said brake drum, an idler pulley over which wire is drawn from said reel, a second lever supporting said idler pulley, vertically spaced pivot means supporting said first and second levers for individual angular movement, yielding means balancing said first and second levers to maintain them normally in substantially horizontal positions, and means connecting said second lever to said brake lever to reduce the pressure of said brake shoe upon said brake drum upon a reduction in the weight of the wire on the delivery reel and upon an increase in the tension of the wire going to said idler pulley.

2. Apparatus as recited in claim 1, wherein said pivot means supports said second lever above said first lever, and said connecting means is a tie rod of adjustable length.

3. Apparatus as recited in claim 1, wherein said brake shoe is a band partially encircling said brake drum, and wherein said brake lever is pivotally mounted on said first lever by a bearing bolt having a gear section and a pin to which one end of said brake band is secured, and a stud journalled on said brake lever and having a worm in mesh with the gear of said bearing bolt.

References Cited in the file of this patent

UNITED STATES PATENTS

| 2,377,014 | Keller | May 29, 1945 |

FOREIGN PATENTS

| 39,847 | France | Dec. 22, 1931 |
| 285,610 | Switzerland | Jan. 5, 1953 |